(12) United States Patent
Remili et al.

(10) Patent No.: US 7,367,792 B2
(45) Date of Patent: May 6, 2008

(54) ARRANGEMENT WITH AN EXTRUSION DIE OF AN EXTRUDER

(76) Inventors: Johannes Remili, Thalhamerstrasse 19, A 4073 Wilhering (AT); Gerhard Hehenberger, A 4622, Eggendorf 108 (AT)

( * ) Notice: Subject to any disclaimer, the term of this patent is extended or adjusted under 35 U.S.C. 154(b) by 351 days.

(21) Appl. No.: 11/117,670

(22) Filed: Apr. 28, 2005

(65) Prior Publication Data
US 2006/0068052 A1    Mar. 30, 2006

(30) Foreign Application Priority Data
Apr. 28, 2004  (AT)  ................................ A 735/2004

(51) Int. Cl.
*B29C 47/12*   (2006.01)
(52) U.S. Cl. .................... 425/382 R; 425/67; 425/311; 425/463; 425/464
(58) Field of Classification Search .................. 425/67, 425/311, 382 R, 462, 463, 464
See application file for complete search history.

(56) References Cited

U.S. PATENT DOCUMENTS

| | | | |
|---|---|---|---|
| 3,516,120 A | | 6/1970 | Braun et al. |
| 4,120,625 A | | 10/1978 | Heckeroth |
| 4,378,964 A | * | 4/1983 | Wolfe, Jr. .................... 425/463 |
| 4,678,423 A | * | 7/1987 | Bertolotti .................... 425/311 |
| 5,593,702 A | * | 1/1997 | Harris et al. .................. 425/67 |
| 5,916,440 A | * | 6/1999 | Garcera et al. ............. 210/232 |
| 6,595,765 B1 | * | 7/2003 | Lengerich et al. ........ 425/131.1 |
| 6,659,757 B2 | * | 12/2003 | Kim et al. ................ 425/376.1 |
| 2004/0115298 A1 | * | 6/2004 | Hehenberger et al. ...... 425/311 |

FOREIGN PATENT DOCUMENTS

FR    1 510 391    12/1967

* cited by examiner

*Primary Examiner*—Yogendra Gupta
*Assistant Examiner*—Maria Veronica Ewald
(74) *Attorney, Agent, or Firm*—Collard & Roe, P.C.

(57) ABSTRACT

The invention relates to an arrangement with an extrusion die (1) of an extruder for granulating plastic material with several pass-through openings (4) for allowing the passage of plastic melt, and a granulating die plate (2) with holes (3) arranged on its die face (1'), with the pass-through openings (4) each opening into a separate nozzle-like projection (6) protruding beyond the front die face (1') of the extrusion die (1), with the free cross section of the holes (3) being larger than the outside circumference of the projections (6) for the contactless reception of the nozzle-like projections (6) in the holes (3) of the granulating die plate (2) by forming a clearance (7), and with an elastic sealing material (10) being arranged between a front face surface (8) of the nozzle-like projection (6) and a supporting element joined with the granulating die plate (2), preferably a holding flange (2') of the granulating die plate (2). In order to create advantageous conditions it is proposed that the nozzle-like projections (6) comprise a web (12) projecting beyond its face surface (8) at each of its inner sides delimiting the pass-through opening (4).

12 Claims, 3 Drawing Sheets

ARRANGEMENT WITH AN EXTRUSION DIE OF AN EXTRUDER

CROSS REFERENCE TO RELATED APPLICATIONS

Applicant claims priority under 35 U.S.C. § 119 of Austrian application number A 735/2004, filed on Apr. 28, 2004.

1. Field of the Invention

The invention relates to an arrangement with an extrusion die of an extruder for granulating plastic material with several pass-through openings for allowing the passage of plastic melt and a die plate with holes arranged on its die face, with the pass-through openings each opening into a separate nozzle-like projection projecting beyond the front die face of the extrusion die, with the free cross section of the holes being larger than the outside circumference of the projections for the contactless reception of the nozzle-like projections in the holes of the granulating die plate by forming a clearance, and with an elastic sealing material being arranged between a front face surface of the nozzle-like projection and a supporting element joined with the granulating die plate, preferably a holding flange of the granulating die plate.

2. Description of the Prior Art

During the granulating of plastic materials, a principal problem occurs in the respect that a relatively high temperature level prevails in the extrusion die and thus in the pass-through openings in order to reliably prevent any solidification of the plastic melt. The plastic melt needs to be cooled off strongly directly after emerging from the pass-through openings, so that a strong temperature drop occurs between the extrusion die and the granulating die plate and the adjacent cutting chamber. Especially during the start-up process, a water circulation guided through the cutting chamber (in the case of underwater granulation) for cooling the plastic melt needs to be already closed before the plastic melt leaves the granulating die plate. In order to prevent any clotting of the granulate, it is necessary that the cooling water comes into contact with the surface of the granulating die plate prior to the emergence of the plastic melt and thus produces a shock-like cooling of the granulating die plate. This can lead to the consequence that the plastic melt already solidifies in a number of holes of the granulating die plate or pass-through openings of the extrusion die and thus occludes individual holes or pass-through openings. This again leads to an uneven expulsion of the plastic melt from the unblocked pass-through openings or holes, leading to an uneven granulate. The start-up process then needs to be stopped and started again. A very high pressure build-up in front of the granulating die plate is obtained by the blockage of a number of pass-through openings or holes as a result of having to overcome the solidified plastic melt in the cooled pass-through openings or holes. This necessitates a melt pump for increased operational reliability of the start-up process, which pump causes high costs however.

An extrusion die is known from U.S. Pat. No. 3,516,120 A which comprises pass-through openings which open into nozzle-like liners which taper conically in their end regions. In order to prevent as much as possible any heat transmission from the granulating die plate which is in connection with the cold cutting chamber into the interior of the pass-through openings and to thus prevent any solidification of the plastic melt in the end region of the pass-through openings, the liners consist of a material with low thermal conductivity, especially quartz glass or the like. During the granulation, different thermal expansions of the extrusion die heated during operation and the granulating die plate which is comparatively cold in operation as a result of the contact with cooling water are obtained, so that displacements are caused between the extrusion die and granulating die plate as a result of the different thermal expansions, by means of which the liners are damaged. Although a clearance can be provided between the granulating die plate and the liner, the front face surface of the lining rests directly on the granulating die plate, so that displacements between the granulating die plate and liners are obtained here too as a result of the different thermal expansions of the extrusion die and the granulating die plate, as a result of which the liners are damaged.

U.S. Pat. No. 4,120,625 A discloses an extrusion die with a granulating die plate, comprising an annular web with several pass-through openings, which web tapers conically towards a free end and which comprises a relatively large annular die face which comes into contact with a rotating cutting knife or the cold ambient environment in a cutting chamber adjacent to the granulating die plate, leading to the likelihood of solidification of the plastic melt in the pass-through channel. Moreover, the granulating die plate rests with a web directly on the front end of the annular web, so that displacements between the annular web of the granulating extrusion die and the granulating die plate occur unavoidably through the different heating of the extrusion die and the granulating die plate. Such displacements lead to the consequence that the direct contact of granulating die plate on the annular web is no longer given and thus smooth operation of the arrangement is no longer possible.

Finally, it is known from FR 1 510 391 A to screw in jet nozzles into the front face surface of an extrusion die of an arrangement for underwater granulation and to arrange sealing rings between the front face surface of the jet nozzles and the granulating die plate which are held by support elements of the granulating die plate. The provision of the sealing rings allows absorbing or compensating unavoidable displacements between the jet nozzles and the granulating die plate by means of the sealing rings. The disadvantageous aspect is that the contact of the sealing rings with the hot plastic melt passing through the jet nozzles cannot be prevented.

SUMMARY OF THE INVENTION

It is therefore the object of the present invention to create an arrangement of the kind mentioned above with which a solidification of the plastic melt in the pass-through openings of the extrusion die or in the openings in the granulating die plate can be prevented reliably and smooth operations can be ensured even in the case of different thermal expansions of the extrusion die and the granulating die plate.

The invention achieves this object in such a way that the nozzle-like projections comprise a web projecting beyond its face surface at each of its inner sides delimiting the pass-through opening.

As a result of the web which is enclosed by the respective sealing material and projects beyond the face surfaces of the nozzle-like projections, a contact of the sealing material with the hot plastic melt can be prevented in a simple way without endangering operations due to different thermal expansions between the granulating die plate and the nozzle-like projections, because displacements caused thereby can be absorbed via the clearance between the nozzle-like projections and the holes of the granulating die plate and via the elasticity of the sealing material.

When the outside circumference and the length of the web are chosen in such a way that the freely protruding web extends in a contactless way at least up to an outlet opening of the hole of the granulating die plate, which opening is formed within the holding flange, it can reliably be prevented even in the case of a blockage of the outlet opening of the granulating die plate that backed-up plastic melt penetrates the clearance between the nozzle-like projection and the hole of the granulating die plate and that the sealing material is damaged.

In order to keep thermal transmission between the cutting chamber adjacent to the granulating die plate, which contains cooling water especially in the case of underwater granulation, and the nozzle-like projections as low as possible, it is advantageous that the web has a thickness of not more than 0.05 to 0.5 mm, especially 0.1 to 0.15 mm at least in its front end region.

It is also advantageous when the nozzle-like projections taper in their cross section towards their free ends, thus providing a comparatively small surface of attack in the direction of the granulating die plate which is comparatively cold during operation, as a result of which a transmission of heat or cold can be kept low.

Since a configuration is given which can be produced simply from a constructional standpoint with a continuous tapering of the cross section of the nozzle-like projections and a respective configuration of the granulating die plate, it is advantageous when the holes and the projections taper conically at least in part.

If a perfluorinated compound (especially a perfluoroelastomer (FFKM)) or a similar elastic sealing material is provided as a sealing material, the required elasticity of the sealing material is given. Moreover, perfluorinated compounds have a relatively high temperature stability and low thermal conductivity. This reliably ensures a long service life of the sealing material and simultaneously a low thermal transmission between the granulating die plate and the nozzle-like projections.

In order to absorb or compensate the displacements between the nozzle-like projections and the granulating die plate which occur in the radial direction of the granulating die plate, tests have shown that it is especially advantageous to use an O-ring as a sealing material.

If separate inserts are provided in the pass-through openings as nozzle-like projections, different inserts can be used in one and the same extrusion die, so that inserts from different materials and with differently large pass-through openings can be used depending on the type of the desired granulate. In principle, materials with a relatively high thermal conductivity must be chosen for the separate inserts, because the inserts should also be heated as much as possible through the heating of the extrusion die, thus reliably preventing any solidification of the plastic melt already in the pass-through openings of the inserts. The thermal insulation between the nozzle-like projections and the granulating die plate occurs via the clearance between the nozzle-like projections and the granulating die plate or the sealing material which is provided at least on the face side. It is understood that the nozzle-like projections could also be arranged in an integral way with the extrusion die.

Tests have shown that a thermal transmission from the cold cutting chamber to the heated extrusion die can be avoided especially when a granulating die plate is disk-shaped, since thus a hollow chamber can be provided between the disk-like granulating die plate and the extrusion die which has a very favorable thermal insulating effect.

BRIEF DESCRIPTION OF THE DRAWINGS

The invention is explained below in closer detail by reference to preferred embodiments shown in the drawings, to which they are not limited.

DESCRIPTION OF THE PREFERRED EMBODIMENTS

Figure 1:
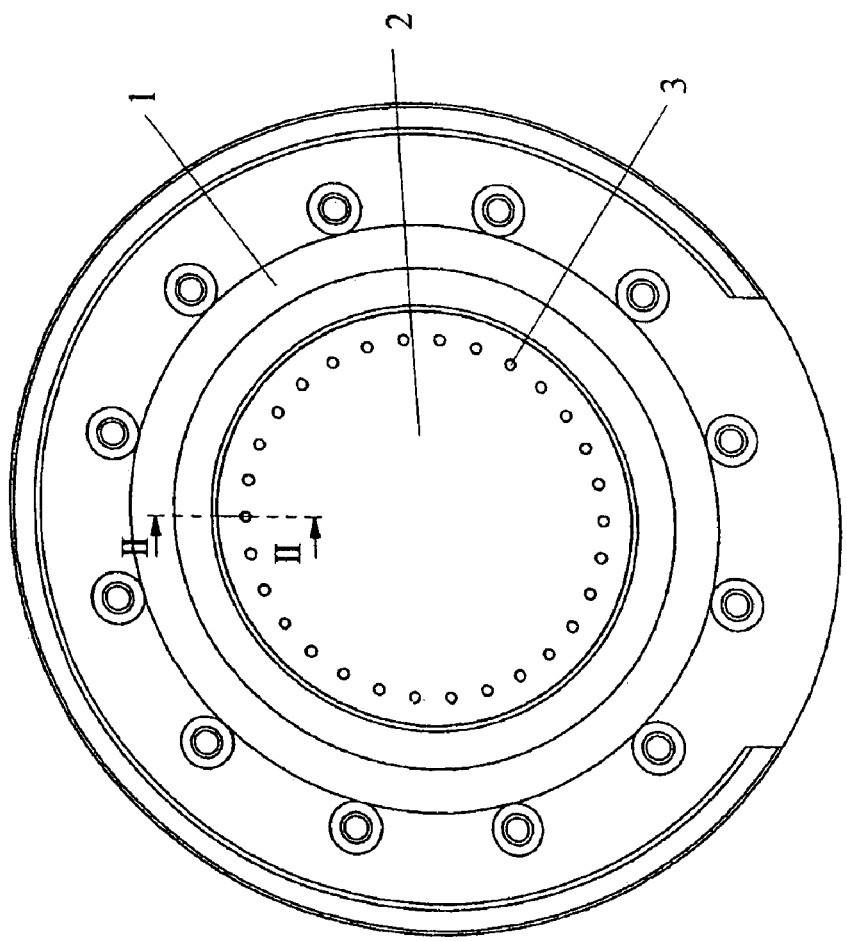
FIG. 1 shows a view of the extrusion die with a disk-like granulating die plate.

FIG. 1 shows an extrusion die 1 on which there is arranged a disk-like granulating die plate 2 with a plurality of holes 3 distributed along a circular circumference for allowing the passage of plastic melt to be granulated. A knife head with cutting knives (not shown) resting on the granulating die plate 2 rotates for granulating the plastic melt emerging from the holes 3, which knife head is arranged in a cutting chamber filled with cooling water especially in the case of underwater granulation, so that the face surface of the arrangement as shown in FIG. 1 is subjected to a cold environment during the granulation.

Figure 2:
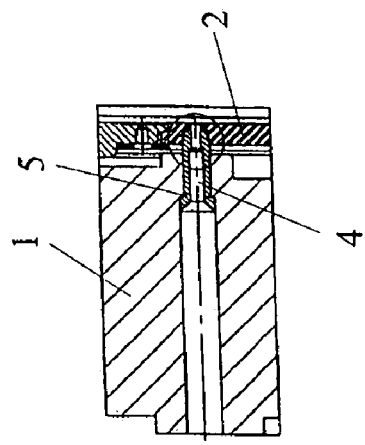
FIG. 2 shows a sectional view along line II-II in FIG. 1.
Figure 3:
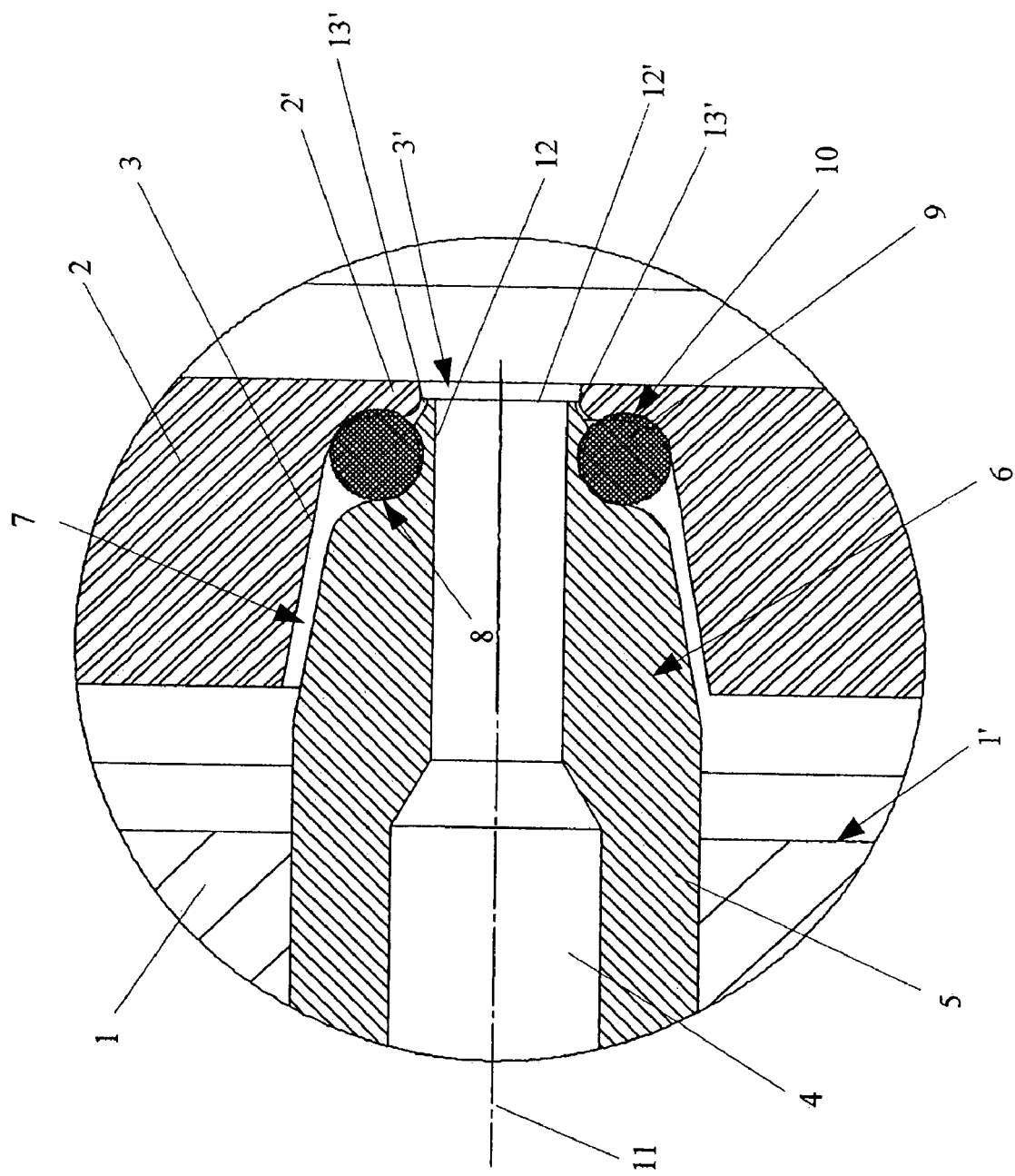
FIG. 3 shows a detailed view of the arrangement of a nozzle-like projection in a hole of the granulating die plate according to FIG. 2.

FIGS. 2 and 3 show a sectional view of a pass-through opening 4 for the plastic material to be granulated. It opens into an insert 5 inserted in the extrusion die 1, which insert comprises a projection 6 which projects in a nozzle-like manner beyond the front face surface 1' of the extrusion die 1. Said projection 6 is received in a hole 3 of the granulating die plate 2, with the free cross section of the hole 3 being larger than the outside diameter of the projection 6, so that a clearance 7 remains between the projection 6 and the granulating die plate 2.

In order to seal the clearance 7 against the entrance of cooling liquid from an adjacent cutting chamber or against the entrance of plastic melt, which clearance 7 is provided as a thermal insulation between the granulating die plate 2 which is comparatively cool in operation and the insert 5 heated through the extrusion die 1, an O-ring 9 is arranged as a sealing material 10 at a front face surface 8 of the nozzle-like projection 6. The O-ring 9 can consist for example of a perfluorinated elastomer FFKM 615, as is sold by Greene, Tweed & Co under the name CHEMRAZ®, or a similar elastic material, in order to compensate or absorb displacements as a result of the different thermal expansions of the projection 6 or the extrusion die 1 and the granulating die plate 2. The displacements occur especially perpendicular to a longitudinal axis 11 of the pass-through openings 4. At the same time, the elastic sealing material 10 has an adverse thermal conductivity, so that it is also provided for insulation between the comparatively cool granulating die plate 2 and the comparatively warm projection 6. In order to allow the O-ring 9 to be received reliably between the face surface 8 of the nozzle-like projection 6 and the granulating die plate 2, the granulating die plate 2 comprises a holding flange 2' which is achieved by means of a reduction in the diameter of hole 3 to a diameter-reduced outlet opening 3'. It is understood that the sealing material 10 can also have a different shape. The sealing material 10 can also especially extend over a random section into the clearance 7.

As is shown especially in FIG. 3, the projection 6 comprises on its inner side delimiting the pass-through opening 4 a web 12 projecting beyond the front face surface 8, which web is configured in such a way that a front end 12' is arranged in a contactless manner within the outlet opening 3' of the hole 3. When the outlet opening 3' is blocked it can thus be prevented that backed-up plastic melt penetrates the clearance 7 between the granulating die plate 2 and the projection 6 and that the sealing material 10 is damaged. Moreover, the web 12 has at its front end 12' merely a material strength of approx. 0.1 to 0.15 mm, so that essentially there are no surfaces of attack for introducing cold into the nozzle-like projection 6 in the direction of the cutting chamber.

As can further be seen from FIG. 3, the nozzle-like projection 6 is arranged eccentric relative to the hole 3 and its outlet opening 3', so that (as shown in FIG. 3) a slightly larger gap 13 between the web 12 and the holding flange 2' is obtained at room temperature in the sectional illustration radially on the outside than in comparison with a radially inwardly disposed gap 13. The radially outside gap 13 has a width of approx. 0.01 mm, which is sufficient for compensating the displacements between the granulating die plate 2 and the projection 6 during the granulating operation. The radially outside gap 13 is thus chosen slightly larger at room temperature than the radially inward gap 13' because the granulating die plate 2 constricts through contact with the cool ambient environment in the cutting chamber, thus primarily producing an approach of the radially outside part of the holding flange 2' towards the projection 6 and thus a reduction of the gap 13 during the operation. The relevant aspect is merely that the displacements can be absorbed via the elastic insulating and sealing material 10. In the worst case, the holding flange 2' can come into contact with the web 12 as a result of the displacements, without actually damaging the same.

Figure 4:
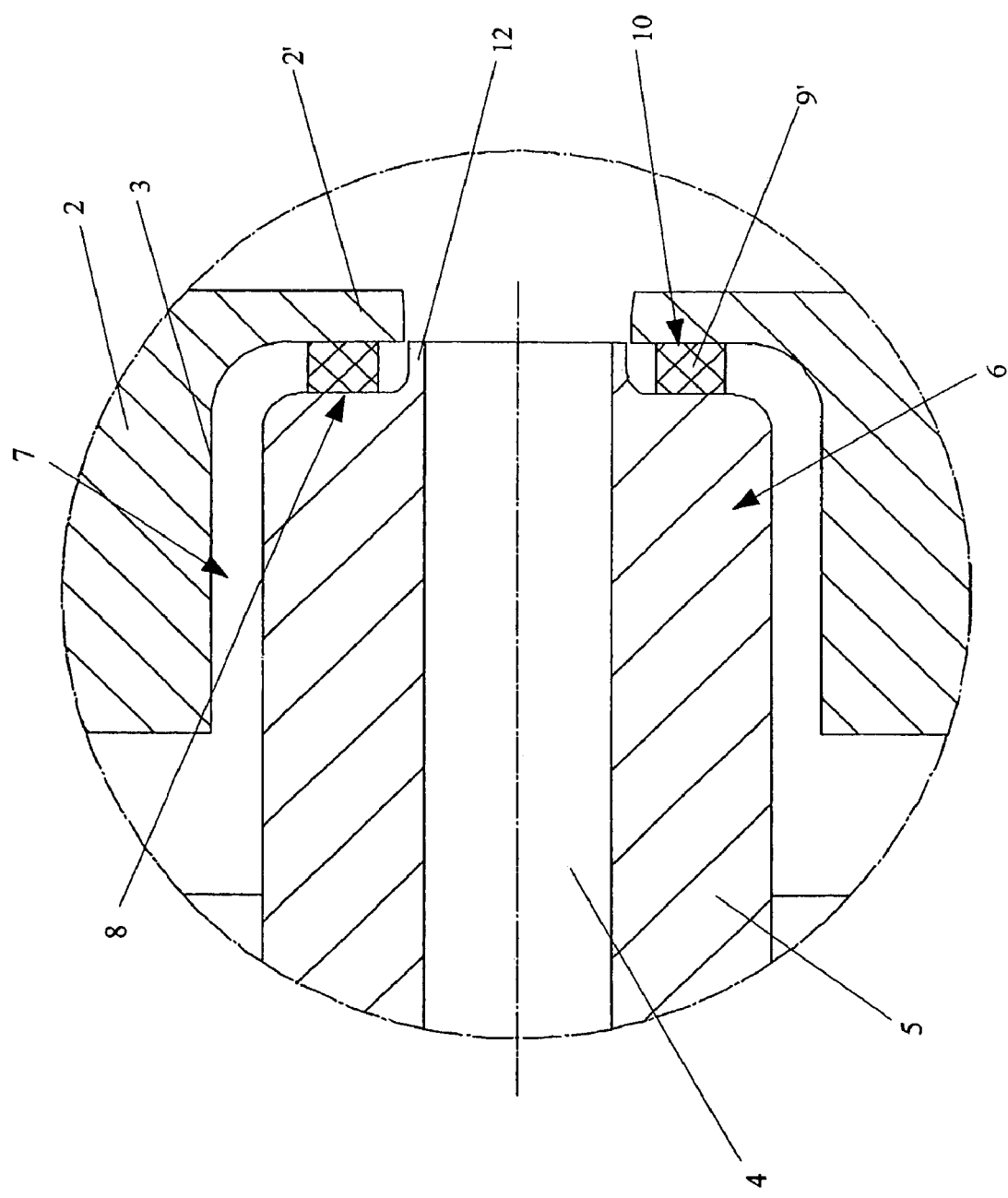
FIG. 4 shows a further detailed view of an embodiment with a cylindrical nozzle-like projection.

FIG. 4 shows an alternative embodiment. Projection 6 is cylindrical and is provided, unlike FIG. 3, with a slightly conical configuration. An elastic insulating and sealing material 10 is arranged on the face surface 8 of the projection 6 (as in FIG. 3) and a clearance 7 is provided between the projection 6 and the granulating die plate 2, so that displacements as a result of different thermal expansions of the granulating die plate 2 and the insert 5 or the extrusion die 1 can be absorbed through the elastic sealing material 10, which can consist for example of perfluoroelastomer FFKM 615. It is also shown that a flat sealing ring 9' is provided as the sealing material 10 instead of the O-ring 9.

The invention claimed is:

1. An arrangement comprising
   (a) an extrusion die of an extruder for granulating plastic material, the extrusion die having
      (1) several pass-through openings allowing the passage of plastic melt;
   (b) a granulating die plate having holes and arranged on an end face of the extrusion die,
      (1) the pass-through openings each opening into a separate nozzle-shaped projection protruding beyond the end face of the extrusion die,
      (2) a free cross section of the holes being larger than an outside circumference of the projections to form a clearance for the contactless reception of the projections in the holes, and
      (3) the projections comprising a web at an inside thereof, the web projecting beyond an end face of the projections and delimiting the pass-through openings; and
   (c) an elastic sealing material arranged between the end face of the projections and a supporting element connected to the granulating plate.

2. An arrangement according to claim 1, wherein the outside circumference and the length of the web are chosen in such a way that the web extends in a contactless way at least up to an outlet opening of the hole of the granulating die plate, which opening is formed within the supporting element.

3. An arrangement according to claim 1, wherein the web has at least in its front end region a thickness of not more than 0.05 to 0.5 mm.

4. An arrangement according to claim 1, wherein the nozzle-like projections taper in their cross section towards their free ends.

5. An arrangement according to claim 4, wherein the holes and the projections taper conically at least in part.

6. An arrangement according to claim 1, wherein the elastic sealing material is a perfluorinated compound.

7. An arrangement according to claim 1, wherein the sealing material is an O-ring.

8. An arrangement according to claim 1, wherein the nozzle-like projections are separate inserts.

9. An arrangement according to claim 1, wherein the granulating die plate is disk-shaped.

10. An arrangement according to claim 1, wherein the supporting element is a holding flange.

11. An arrangement according to claim 3, wherein the thickness ranges from 0.1 to 0.15 mm.

12. An Arrangement according to claim 6, wherein the perfluorinated compound is a perfluoroelastomer (FFKM).

* * * * *